(12) United States Patent
Van Felius (10) Patent No.: US 6,170,170 B1
(45) Date of Patent: Jan. 9, 2001

(54) DEVICE AND METHOD FOR TRANSPORTING PRODUCTS SUCH AS LEAFED VEGETABLES

(75) Inventor: Jan Van Felius, Em Rhenoy (NL)

(73) Assignee: Felcon Engineering B.V., Waardenburg (NL)

( * ) Notice: Under 35 U.S.C. 154(b), the term of this patent shall be extended for 0 days.

(21) Appl. No.: 09/171,694

(22) PCT Filed: Apr. 25, 1997

(86) PCT No.: PCT/NL97/00222

§ 371 Date: Mar. 23, 1999

§ 102(e) Date: Mar. 23, 1999

(87) PCT Pub. No.: WO97/40714

PCT Pub. Date: Nov. 6, 1997

(30) Foreign Application Priority Data

Apr. 26, 1996 (NL) .................................................. 1002958

(51) Int. Cl.[7] ...................................................... F26B 5/08
(52) U.S. Cl. .............................. 34/313; 34/318; 34/328; 34/58; 34/236; 210/781
(58) Field of Search .................... 34/58, 60, 61, 34/184, 186, 236, 312, 317, 318, 328, 313, 425; 210/781, 784, 360.1, 380.1, 380.3

(56) References Cited

U.S. PATENT DOCUMENTS

| 3,313,034 | * | 4/1967 | Meyer | 34/58 |
|---|---|---|---|---|
| 4,461,096 | * | 7/1984 | Suzuki | 34/58 |
| 4,493,156 | * | 1/1985 | Siegmann | 34/58 |
| 5,027,530 | | 7/1991 | Vollmer et al. | 34/58 |
| 5,928,072 | * | 7/1999 | Fulcher et al. | 452/1 |
| 5,992,042 | * | 11/1999 | Mitchell et al. | 34/319 |

FOREIGN PATENT DOCUMENTS

| 29 18 008 | 11/1980 | (DE) . |
|---|---|---|
| 0173676 | 3/1986 | (EP) . |
| 2700925 | 8/1994 | (FR) . |
| 9301825 | 5/1995 | (NL) . |
| 9000714 | 1/1990 | (WO) . |

OTHER PUBLICATIONS

Patent Abstracts of Japan vol. 13, No. 11 Japanese Publication No. 63–218269 A, 1 page.

* cited by examiner

*Primary Examiner*—Pamela Wilson
(74) *Attorney, Agent, or Firm*—Webb Ziesenheim Logsdon Orkin & Hanson, P.C.

(57) ABSTRACT

A leafed vegetable dryer includes an entrance for products, an exit for the products and one or more transporters for transporting the products between the entrance and the exit. The transporters have the form of a centrifuge. A transport driver is utilized to drive the transporters and a centrifuge driver is utilized to drive the centrifuge.

12 Claims, 7 Drawing Sheets

DEVICE AND METHOD FOR TRANSPORTING PRODUCTS SUCH AS LEAFED VEGETABLES

BACKGROUND OF THE IVENTION

1Field of the Invention

The invention relates to a device and method for transporting products such as leafed vegetables, including leafed vegetables, potatoes and the like.

2. Description of the Prior Art

Before leafed vegetables are packaged for market, they are firstly washed and dried.

Devices for drying products such as washed leafed vegetables are known from the Dutch patent application 9301825 and the WO publication 90/00714.

A problem with these devices is that the continuous drying and transporting of products to a desired packaging area cannot be efficiently carried out.

An object of the present invention is to solve this problem.

SUMMARY OF THE INVENTION

According to a first aspect of the present invention there is provided a device for transporting and drying products such as leafed vegetables, said device comprising:

an entrance for the products;

an exit for the products;

one or more transporters for transporting the products between the entrance and the exit wherein the transporters have the form of a centrifuge;

transporter driving means for driving the transporters; and centrifuge driving means for driving the centrifuge.

Hence, products such as leafed vegetables can be continuously dried and transported utilizing the device according to the present invention. The combination of transporters, which also function as a centrifuge, makes it possible to simultaneously effect drying of the leafed vegetables, by means of the centrifugal working of the transporters, and transporting thereof.

The present invention furthermore provides a method for transporting products, such as washed leafed vegetables, wherein the articles are simultaneously dried and transported to a desired area, said process comprising:

placing of the articles on one or more driven transporters, whereby the articles are transported by the transporters, and wherein the transporters are simultaneously rotated around an axis whereby the articles are subjected to a centrifugal drying force.

The present invention furthermore provides a replaceable cassette for the above device, said cassette comprising one or more transporters for transporting products, and joining means for joining the cassette to the device.

Since the cassette is replaceable, the maintenance and cleaning of the device is facilitated.

Further preferred features of the present invention are referred to in the claims and in the specific description.

BRIEF DESCRIPTION OF THE DRAWINGS

The invention will now be further illuminated referring to the figures wherein.

DETAILED DESCRIPTION OF THE PREFERRED EMBODIMENTS

Figure 1:
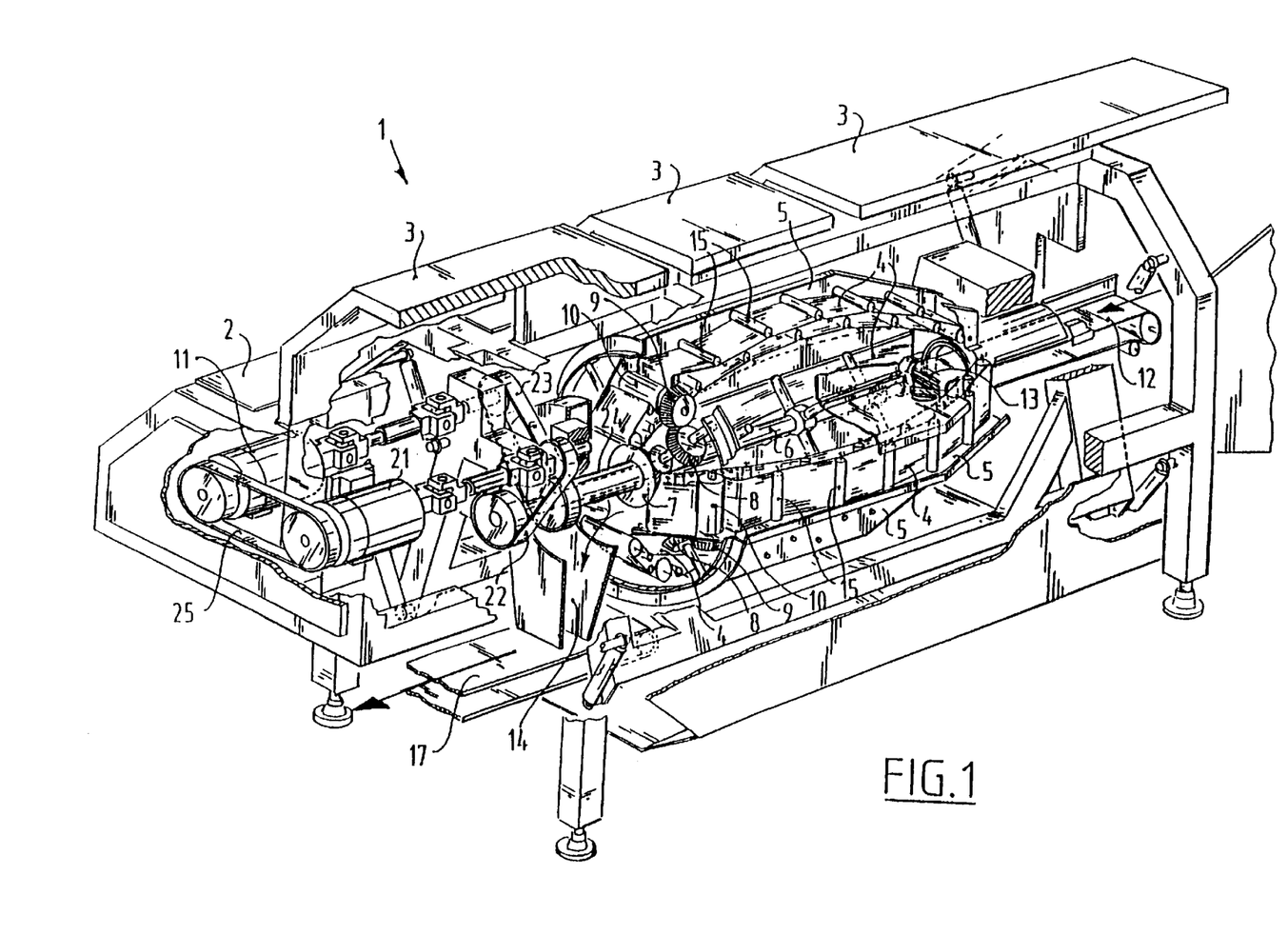
FIG. 1 shows a partially cut away, perspective view of the device according to the invention.
Figures 4, 5:
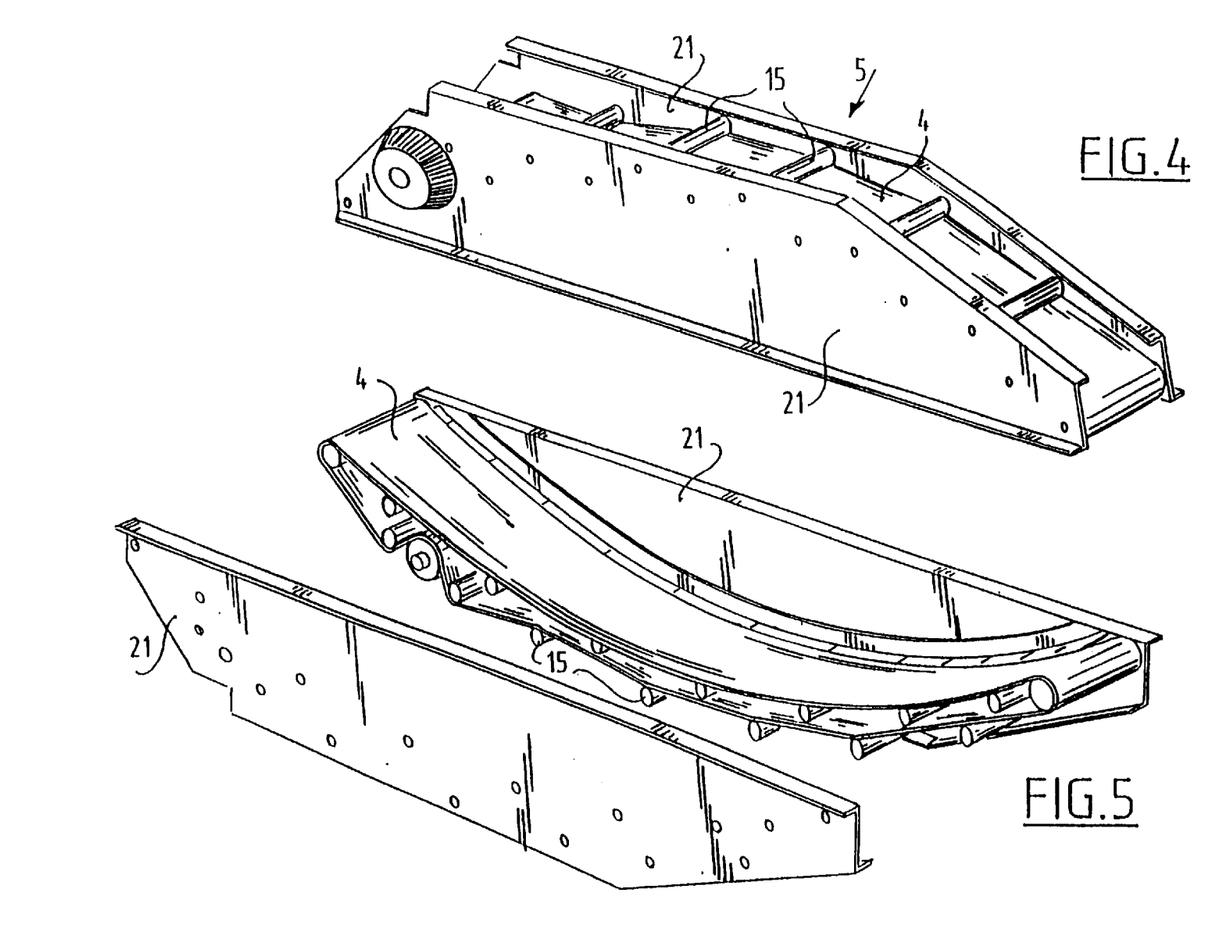
FIG. 4 shows a perspective view of a replaceable cassette according to the present invention.
FIG. 5 shows an exploded view of a replaceable cassette according to the present invention.

The device 1, FIG. 1, comprises a housing 2 with three doors 3, wherein four transport belts 4 are mounted in replaceable cassettes 5 (see also FIGS. 4 and 5).

The transport belts 4 are driven by means of two motors 11 and 21 via a rotatable axle 6, an axle gear wheel 7, bevelled gear wheels 8, belt gear wheels 9 and belt main rollers 10. The motor 21 drives the drive belt 22 which transmits driving force to the axle 6.

The motor 11 drives the driving belt 23 which transmits driving force to the axle shaft 24.

When the axle 6 is driven, the axle shaft 24 is also rotated whereby, by means of the axle gear wheel 7, the bevelled gear wheels 8 are rotated whereby the belts 4 are also rotated by means of the bevelled gear wheels 8 being in contact with the belt gear wheels 9. In such way, the belts 4 function as a centrifuge.

In order to permit the belts 4 to run in the direction of the exit 14, motor 11 is tuned to work harder than motor 21, whereby the axle shaft 24, driven by the drive belt 23, rotates quicker than the axle 6 whereby the axle shaft wheel 7 transmits the driving force to the belt gear wheels 9 via the bevelled gear wheels 8. Accordingly, the belt main rollers 10 mounted on the belt gear wheels 9 are in turn driven whereby the belts 4 are driven around the supporting rollers 15, to provide the transport working of the belts 4.

Hence the belts 4 can be driven in a longitudinal direction in the cassettes 5 and simultaneously rotated about the axle 6 whereby a transport working and a centrifugal working is simultaneously provided, whereby products can be continuously dried and transported.

Since the motors are tuned to one another, by means of amongst other things the belt 25, the running speed of the belts 4 and the rotation speed of the centrifuge can be adjusted independently from one another. This yields advantages that the staying time of a product in the centrifuge is independent of the number of revolutions of the centrifuge and that both the number of revolutions of the centrifuge and the running speed of the belts are adjustable.

On using the device 1 in order to transport leafed vegetables for example, the washed leafed vegetables are placed on a supplying transporter 12 where subsequently they fall via an entrance 13 onto one of the running belts 4. During this transportation, the vegetables are subsequently transported to an exit 14 of the device by the device by the longitudinal working of the belts 4.

The four belts 4 are simultaneously rotated about the axle 6 in order function as a centrifuge whereby the leafed vegetables are de-watered.

Since the belts 4 are mounted in the cassettes 5 and supported by the support rollers 15, in such a way that they have an elliptical form, a maximum centrifugal force is achieved in the middle of the centrifuge in order to effect an efficient de-watering, whereby the centrifugal forces are accordingly smallest at the entrance 13 and exit 14 whereby any possible damage to the vegetables on the feeding thereof into and out of the device is kept to a minimum.

The support rollers 15 provide the belts 4 with a wavelike movement whereby water is easily removed. In order to facilitate exit of water from the device, the device may be equipped with water exit openings which for example can be provided in the running belts and furthermore the device can comprise water drainage means, not shown, for drainage of the water.

The dried products leave the device through the exit 14 to find themselves on the transporter 17.

The doors 3 are automatically locked on starting up of the device by means of securing means (not shown) whereby the device is only able to be started when all the doors are locked.

In order to prevent any possible accidents, the device is preferably operated from a separate operating panel.

The above described embodiment of the device according to the present invention preferably has the following dimensions and technical specifications:

| | |
|---|---|
| Maximum revolution: | 400 rpm |
| Power: | about 5.5 kw |
| Dimensions: | length about 3600 mm |
| | height about 1500 mm |
| | breadth about 1400 mm, |

Whereby the device can process about 1000 kg of products per hour having a weight of about 0.2 kg per product and a staying time of about 15 seconds within the device.

These specifications are not limiting for the present invention, the device can for example be tuned to work at about 2000 rpm.

Figure 2:
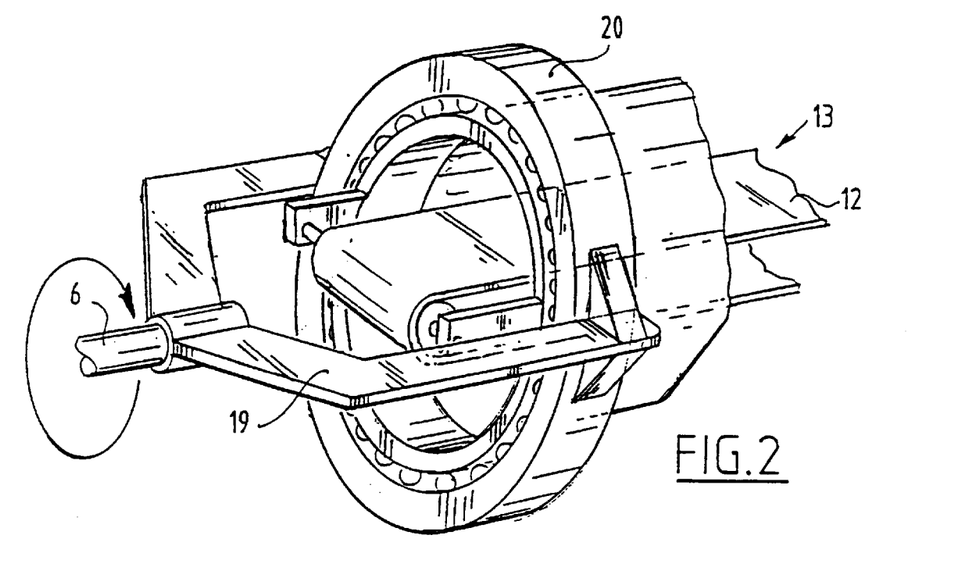
FIG. 2 shows a perspective view of one embodiment of the entrance of the device according to the present invention.
Figure 3:
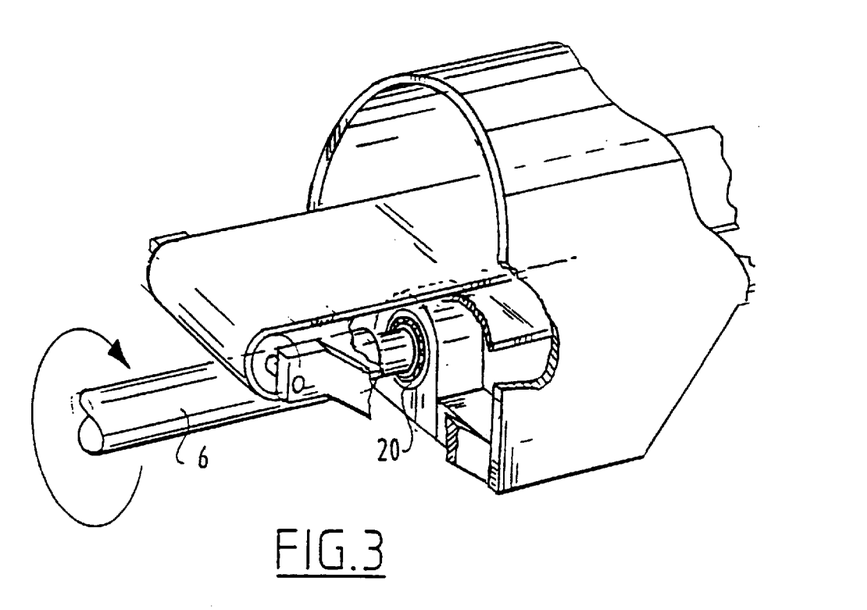
FIG. 3 shows a second embodiment of the entrance of the device according to the present invention.

FIGS. 2 and 3 show two different arrangements for mounting the axle at the entrance, whereby in FIG. 2 the axle is mounted on a rotatable, ring shaped ball bearing 18 by means of a fork 19, whereby products are able to fall unhindered into the centrifuge.

In FIG. 3, the rotatable axle is mounted in a secure ball bearing 20 mounted under the supply transporter.

FIGS. 4 and 5 show replaceable cassettes wherein the belts 4 are mounted around the support rollers 15. These cassettes 5 have side walls 21 and joining means (not shown) for joining the cassettes to the device.

A second embodiment 30, FIGS. 6, 7, 8, 9 and 10, of the device according to the present invention differs from the first embodiment as shown in FIG. 1 in that a motor 32 is mounted directly above a belt wheel 34 on an axle shaft 36. Furthermore a reduction gear box 38 (variator) is also connected to the axle shaft 36 by a belt 40. The motor 32 and variator 38 are mounted on a frame part 42, which in turn supports the axial shaft 36, said frame part being mounted on the main frame 44 of the device by means of shock absorbers 46. This embodiment has an entrance 48 at the opposite end thereof to the motor 32 and an outlet exit 50 arranged below the motor 32.

Figure 6:
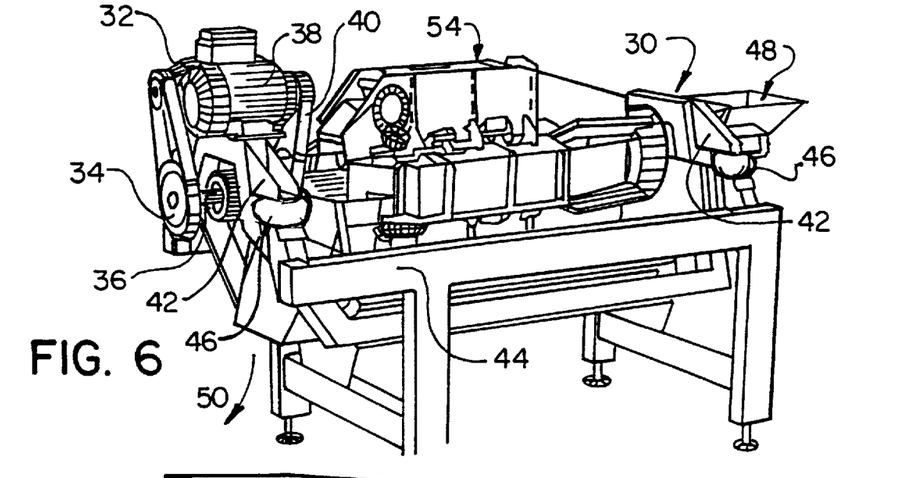
FIG. 6 shows a partially cut away perspective view of a second embodiment of the device according to the present invention.
Figures 7, 8:
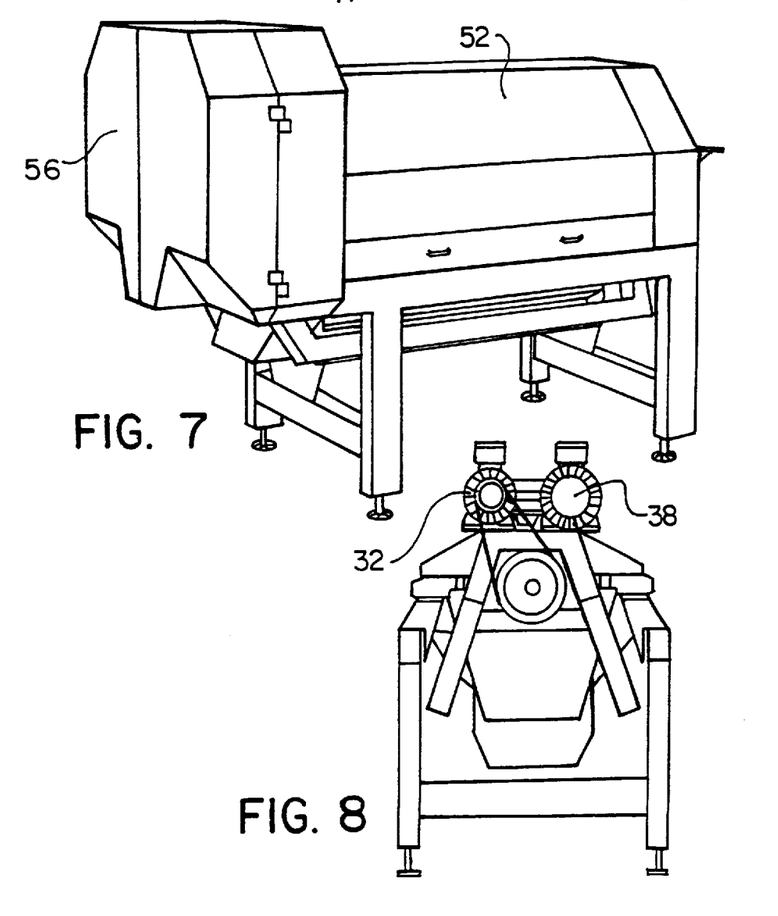
FIG. 7 shows a perspective view of the embodiment as shown in FIG. 6 in its housing.
FIG. 8 shows an end view of the embodiment from FIG. 6.
Figure 9:
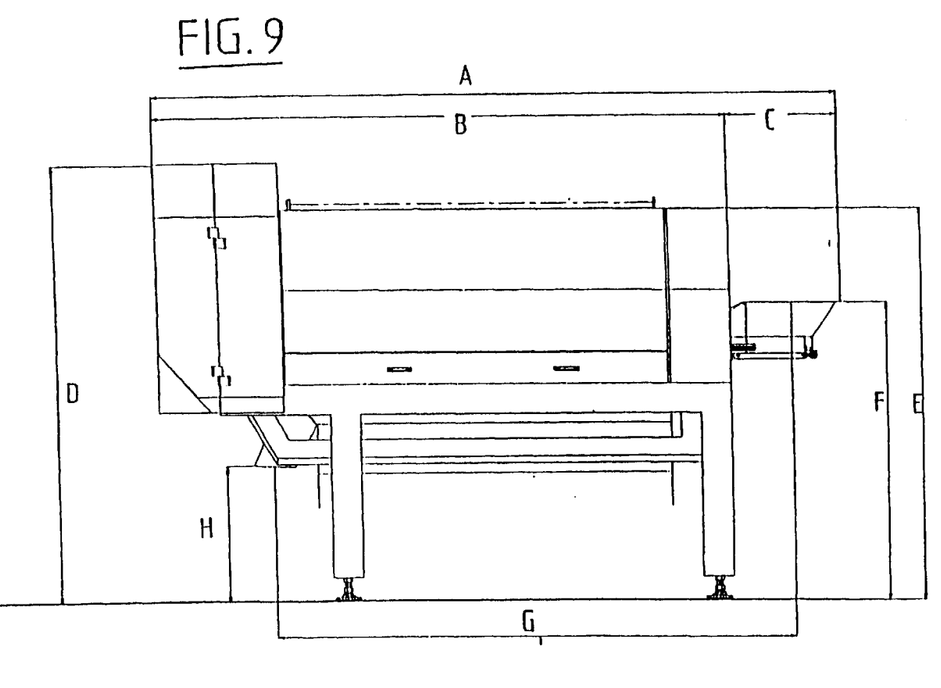
FIGS. 9 and 10 show respectively a side and end view of the embodiment as shown in FIG. 7.

FIG. 7 shows the embodiment from FIG. 6, when arranged in a housing 52 for the centrifuge 54 and a housing 56 for the motor 42, the variator 48 and the drive wheel 34.

Figure 10:
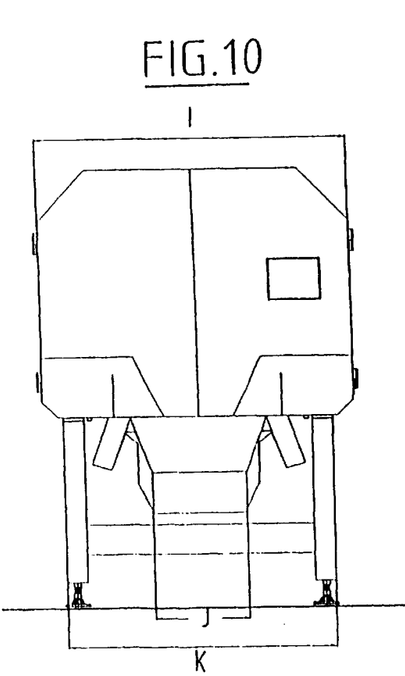
Figures 11, 12:
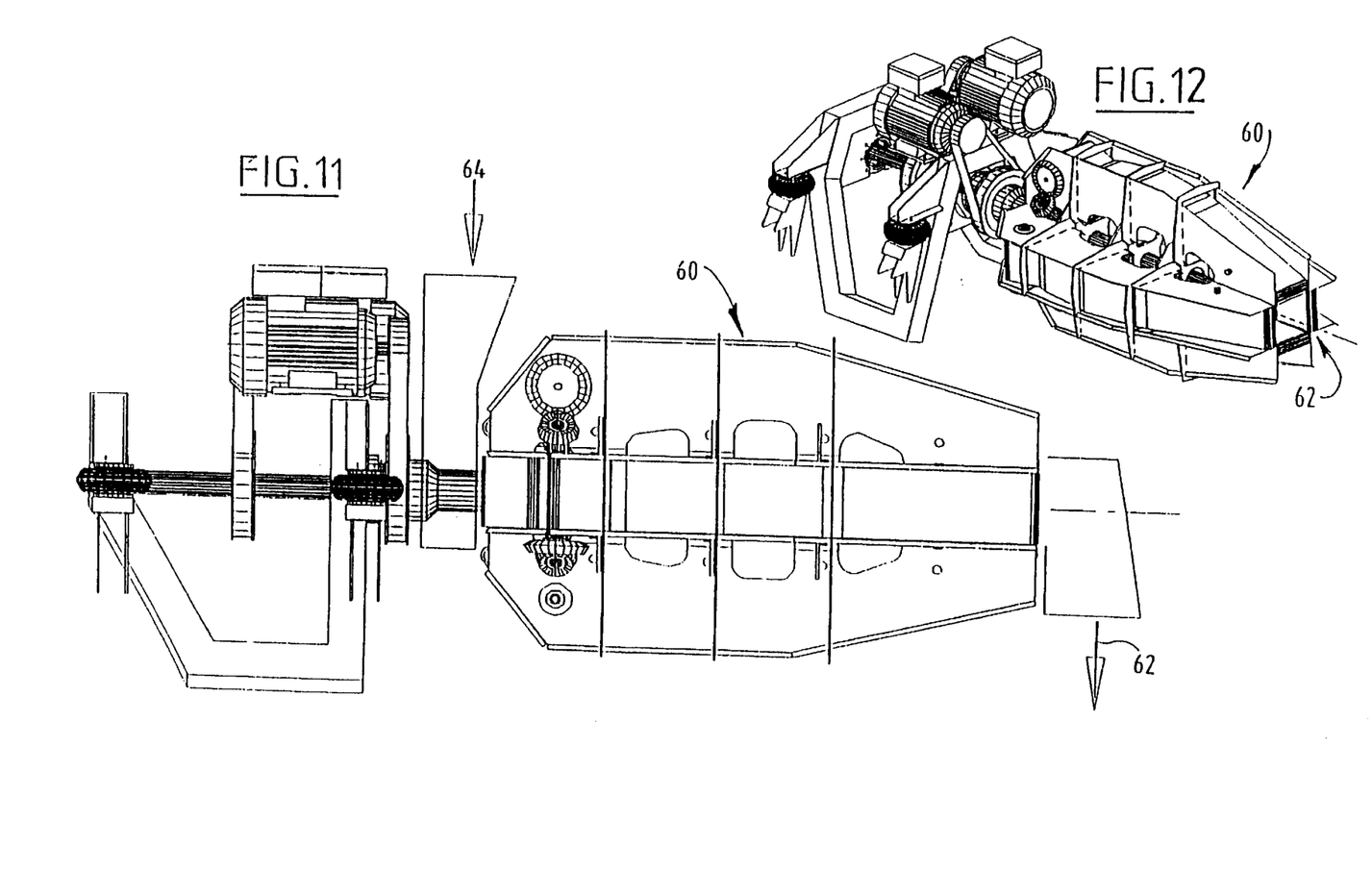
FIG. 11 shows a partially cut away side view of a third embodiment of the device according to the present invention.
FIG. 12 shows a partially cut away perspective view of the embodiment from FIG. 11.

FIGS. 10 and 11 under letters A to K show the dimensions in millimeters of this embodiment of the invention.

A=3315 mm
B=2775 mm
C=540 mm
D=2125 mm
E=1912 mm
F=1475 mm
G=2518 mm
H=675 mm
I=1500 mm
J=454 mm
K=1300 mm

A third embodiment 60 of the present invention, see FIGS. 11 to 14, has the rotatable axle mounted in a secure bearing arranged between the motor and the centrifuge (see FIGS. 11 and 12).

In this way the outlet 62 can be made larger than in embodiments 1 and 2, whereby the entrance 64 is also arranged between the motor and the centrifuge.

Figure 13:
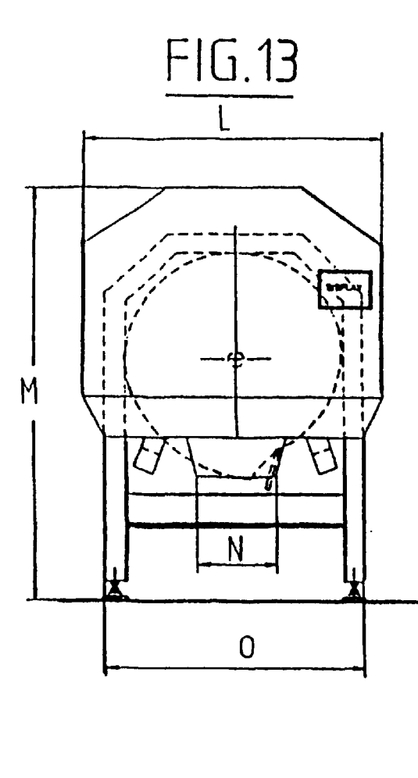
FIGS. 13 and 14 show the embodiment of FIGS. 11 and 12 in an end and side view respectively.
Figure 14:
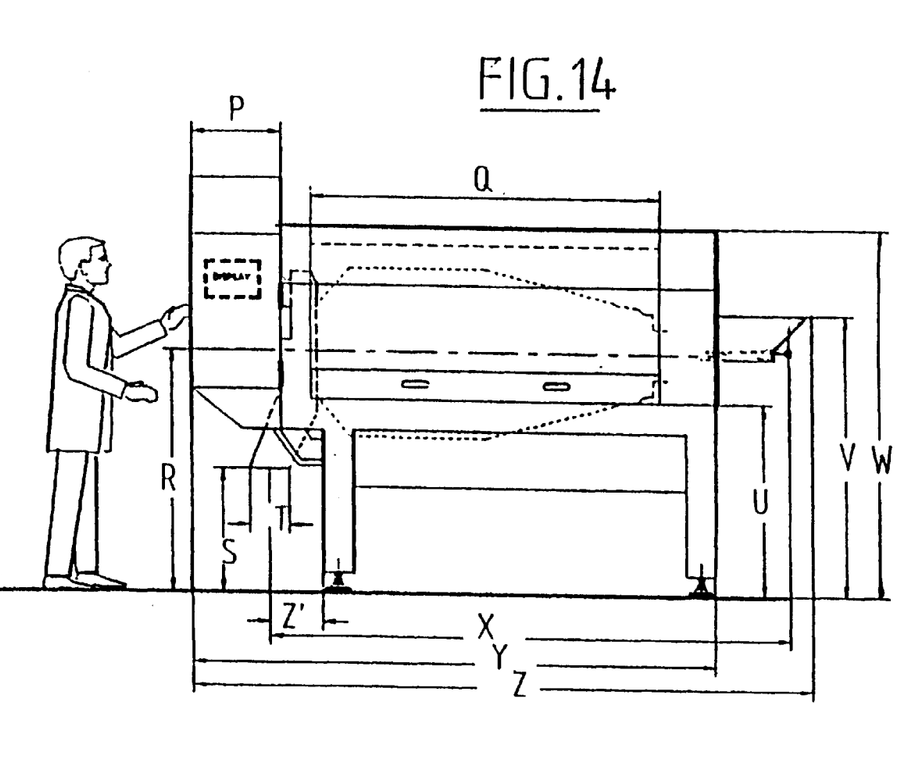

Dimensions of this third embodiment are shown in FIGS. 13 and 14, with reference to letters L to Z'.

L=1500 mm
M=2138 mm
N=400 mm
O=1300 mm
P=445 mm
Q=2518 mm
R=675 mm
S=650 mm
T=200 mm
U=991 mm
V=1446 mm
W=1888 mm
X=2600 mm
Y=2600 mm
Z=3101 mm Z' = 264 mm

Embodiments 2 and 3 take up less space than the first embodiment in order to provide a greater working flexibility of the device according to the present invention, with respect to the working areas.

It will be clear that the invention is not limited to the embodiments shown and described, but that amendments are conceivable without falling outside of the protection of the following claims.

What is claimed is:

1. A device for transporting products, said device comprising:
   an entrance for products;
   an exit for the products;
   one or more transporters for transporting of the products along a longitudinal axis between the entrance and the exit wherein the transporters are configured to be rotated centrifugally about the longitudinal axis;

a transport driving means for driving of the transporters along the longitudinal axis; and a centrifuge driving means for driving the transporters centrifugally, wherein the transporters are mounted in replaceable cassettes.

2. The device according to claim 1, wherein the transport driving means and centrifuge driving means comprise one or more motors.

3. The device according to claim 2, further comprising driving force transmission means for transmitting the driving force to the transporters.

4. The device according to claim 3, wherein the driving force transmission means comprise a rotatable axle.

5. The device according to claim 4, wherein one or more bevelled gear wheels extend from the rotatable axle in order to couple in a rotatable manner with one or more bevelled wheels mounted on the transporters.

6. The device according to claim 1, wherein the transporters extend in a longitudinal direction outwardly from the entrance, before extending downwardly back to the exit.

7. The device according to claim 1, wherein the transport driving means is driveable at a different speed than the centrifuge driving means.

8. The device according to claim 1, wherein the centrifuge is rotatable at a speed between 1–2000 rpm.

9. The device according to claim 1, further comprising one of
   (i) a supply transporter for supplying articles to the entrance and
   (ii) a transporter for transporting the articles away from the exit.

10. A method of drying products in a dryer, the method comprising the steps of:

placing the products onto one or more transporters for transportation thereby; and simultaneously rotating the one or more transporters whereby the products are subjected to a centrifugal force, wherein the transporters are mounted in replaceable cassettes.

11. The method according to claim 10, wherein the dryer comprises:

an entrance for the product;

an exit for the product, with the transporter positioned for transporting the product along a longitudinal axis from the entrance to the exit, with the transporter is configured to be rotated centrifugally about the longitudinal axis;

a transport driver which drives the transporter along the longitudinal axis; and a centrifuge driver which drives the transporter centrifugally.

12. A cassette for transporting products, the cassette comprising:

one or more transporters for transporting products along a longitudinal axis, with the transporters configured to be rotated centrifugally about the longitudinal axis;

wherein the cassette is configured to be replaceable.

* * * * *